(12) United States Patent
Trewin et al.

(10) Patent No.: US 9,040,947 B2
(45) Date of Patent: May 26, 2015

(54) CONTACTLESS COUPLING AND METHOD FOR USE WITH AN ELECTRICAL APPLIANCE

(75) Inventors: Christopher Scott Trewin, Wynyard (AU); Johnny Fabian Russell, Battery Point (AU); Christian Albin Weimann, Mountain River (AU); Michael Rodway, Lower Snug (AU)

(73) Assignee: 300K Enterprises Pty Ltd, Wynyard, Tasmania (AU)

( * ) Notice: Subject to any disclaimer, the term of this patent is extended or adjusted under 35 U.S.C. 154(b) by 52 days.

(21) Appl. No.: 13/510,102

(22) PCT Filed: Nov. 12, 2010

(86) PCT No.: PCT/AU2010/001513
§ 371 (c)(1),
(2), (4) Date: May 16, 2012

(87) PCT Pub. No.: WO2011/057343
PCT Pub. Date: May 19, 2011

(65) Prior Publication Data
US 2012/0228529 A1    Sep. 13, 2012

(30) Foreign Application Priority Data
Nov. 16, 2009  (AU) ................................ 2009905570

(51) Int. Cl.
*G02B 27/00*   (2006.01)
*H01F 38/14*   (2006.01)
(Continued)

(52) U.S. Cl.
CPC .................. *H01F 38/14* (2013.01); *F21S 8/086* (2013.01); *F21V 25/02* (2013.01); *F21V 25/12* (2013.01);
(Continued)

(58) Field of Classification Search
USPC ............. 250/338.1, 551; 315/152, 70; 29/876
See application file for complete search history.

(56) References Cited

U.S. PATENT DOCUMENTS 5,068,890 A     11/1991  Nilssen ........................... 379/90
5,264,997 A *   11/1993  Hutchisson et al. .......... 362/645
(Continued)

FOREIGN PATENT DOCUMENTS

DE   20 2007 012 248     11/2007  .............. F21V 23/00
EP        0 357 829       3/1990  .............. H01F 23/00
(Continued)

OTHER PUBLICATIONS

International Search Report for International Application No. PCT/AU2010/001513, Jan. 14, 2011.
(Continued)

*Primary Examiner* — David J Makiya
*Assistant Examiner* — Taeho Jo
(74) *Attorney, Agent, or Firm* — Kusner & Jaffe

(57) ABSTRACT

A coupling and various methods of use of the coupling. In one embodiment a coupling is provided for use with an appliance operated by a power supply, which coupling allows mounting/dismounting of the appliance without electrical isolation from the supply, said coupling comprising: a) a mounting member having a first encapsulated transformer element and suitable controls connectable to the power supply, said member being suitable for fixing to a structure; and b) a holder member engageable with said mounting member and suitable for holding or for connecting thereto an appliance, said holder member including a second encapsulated transformer element able to conduct power to an appliance.

13 Claims, 11 Drawing Sheets

(51) Int. Cl.
*H02J 5/00* (2006.01)
*H05B 37/03* (2006.01)
*F21S 8/08* (2006.01)
*F21V 25/02* (2006.01)
*F21V 25/12* (2006.01)
*F21W 131/101* (2006.01)
*F21W 131/103* (2006.01)
*F21W 131/402* (2006.01)
*F21Y 101/02* (2006.01)

(52) U.S. Cl.
CPC .... *F21W 2131/101* (2013.01); *F21W 2131/103* (2013.01); *F21W 2131/402* (2013.01); *F21Y 2101/02* (2013.01); *H02J 5/005* (2013.01); *H05B 37/032* (2013.01); *Y02B 20/72* (2013.01)

(56) References Cited

U.S. PATENT DOCUMENTS

| | | | |
|---|---|---|---|
| 5,600,208 A * | 2/1997 | Katou et al. | 315/70 |
| 5,911,499 A * | 6/1999 | Stafford et al. | 362/240 |
| 6,095,671 A * | 8/2000 | Hutain | 362/373 |
| 6,219,267 B1 * | 4/2001 | Andres | 363/146 |
| 6,462,476 B1 * | 10/2002 | Hirschmann et al. | 315/58 |
| 6,476,520 B1 | 11/2002 | Bohm et al. | 307/104 |
| 6,919,687 B2 * | 7/2005 | Kika | 315/57 |
| 2003/0090889 A1 * | 5/2003 | Wacyk et al. | 362/85 |
| 2003/0201731 A1 | 10/2003 | Baarman | 315/276 |
| 2004/0130915 A1 | 7/2004 | Baarman | 363/21.02 |
| 2005/0286646 A1 * | 12/2005 | Fails et al. | 375/259 |
| 2006/0055248 A1 * | 3/2006 | Archdekin et al. | 307/139 |
| 2007/0183133 A1 | 8/2007 | Buij et al. | 362/85 |
| 2007/0187128 A1 * | 8/2007 | Sun | 174/60 |
| 2007/0262730 A1 * | 11/2007 | Ogasawara et al. | 315/248 |
| 2009/0009093 A1 | 1/2009 | Vernondier et al. | 315/158 |
| 2010/0027281 A1 * | 2/2010 | Waters et al. | 362/470 |
| 2010/0141153 A1 * | 6/2010 | Recker et al. | 315/149 |
| 2010/0177537 A1 * | 7/2010 | Kitamura et al. | 363/21.02 |
| 2010/0204841 A1 * | 8/2010 | Chemel et al. | 700/282 |
| 2011/0076880 A1 * | 3/2011 | Fleisig | 439/501 |
| 2012/0038281 A1 * | 2/2012 | Verfuerth | 315/152 |
| 2013/0020937 A1 | 1/2013 | Tatara et al. | 315/77 |

FOREIGN PATENT DOCUMENTS

| | | | |
|---|---|---|---|
| EP | 2 031 300 | 3/2009 | F21V 23/02 |
| JP | 56-147380 | 11/1981 | H01R 33/24 |
| JP | 7-29502 | 6/1995 | G02B 6/36 |
| JP | 195 41 438 | 5/1996 | H01J 61/56 |
| JP | 2000-208350 | 7/2000 | H01F 38/14 |
| JP | 2000-252145 | 9/2000 | H01F 38/14 |
| JP | 2000-513880 | 10/2000 | H01F 38/14 |
| JP | 2002-10535 | 1/2002 | H02J 17/00 |
| JP | 2005-224017 | 8/2005 | H02J 17/00 |
| JP | 2007-533094 | 11/2007 | H05B 37/02 |
| JP | 2009-21292 | 1/2009 | H01F 38/14 |
| WO | WO 94/28560 | 12/1994 | H01F 23/00 |
| WO | WO 2006/012701 | 2/2006 | F21L 4/08 |
| WO | WO 2006/119831 | 11/2006 | H02J 3/00 |
| WO | WO 2009/047768 | 4/2009 | H02M 5/06 |
| WO | WO 2009/129232 | 10/2009 | H05B 37/02 |

OTHER PUBLICATIONS

International Preliminary Report on Patentability (PCT/IPEA/409) for International Application No. PCT/AU2010/001513, Mar. 16, 2012.

Extended European Search Report issued in connection with corresponding European Patent Application No. 10829360.6, dated Jun. 11, 2013.

Notice of Reasons for Rejection issued in connection with corresponding JP2012-539143, dated Jul. 17, 2014.

* cited by examiner

CONTACTLESS COUPLING AND METHOD FOR USE WITH AN ELECTRICAL APPLIANCE

TECHNICAL FIELD

The present invention relates to a coupling for use with electrical appliances such as lamp fittings particularly those present at industrial sites where hazardous conditions or exposed conditions exist. These are environments containing gases, fumes, dust and fluids and include mining sites, factories, roads and road tunnels and the like.

BACKGROUND ART

Electric lamp fittings and other powered appliances are in common use across the world in both domestic and industrial/commercial situations.

Industrial lamp fittings and other powered appliances used in industrial situations such as instrumentation, electric motors, control valves, junction boxes and process instrumentation and the like may be large and heavy and mounted inconveniently for maintenance because of being mounted at height or present in a dangerous environment. Such lamps and other appliances may be mounted to a spigot at the end of a pole or on a proprietary bracket.

Due to conditions present at various industrial sites maintenance of lamps and other electrical appliances often presents difficulties. For example, control valves, junction boxes and process instrumentation need to be removed for maintenance, inspection or repair as in situ operations are either onerous for the worker or not allowed due to safety considerations. Similarly in the case of light fittings, the light fitting needs to be removed from the mounting or disassembled, maintenance work carried out and the light fitting reassembled, if necessary and then secured back to the mounting in one operation. As specialized lifting equipment is generally required to gain access to such lights and other appliances, these maintenance operations are carried out by the maintenance personnel on an elevated work platform, scissor lift, scaffold or other apparatus, which presents difficulties and may be expensive due to hourly hire rates applicable to such equipment. Similar difficulties arise in any situation in which work is carried out on location rather than in a workshop environment, for example, lights mounted on elevated walkways and other elevated points for example in mine sites. Further difficulties include interference with traffic or any other operations being conducted in the vicinity of the light fitting. For example whilst working at height the area has to be barricaded and traffic and personnel restrictions are put in place. Access equipment is charged out by the hour making most simple tasks such as changing a light globe expensive.

In addition to the above difficulties hazardous areas present an even greater challenge. Hazardous areas are classified as such due to the presence of gas, vapours, solvents, chemicals, dust, and any other combustible material being present in the work or plant environment. The restrictions placed upon workers carrying out maintenance in these areas are extremely high. At no point can a worker have live or powered terminals exposed to the atmosphere containing these combustible materials. Gas testing and monitoring must be carried out before and during any maintenance can commence. Basically to carry out any maintenance the worker must be able to completely isolate all power from the equipment being tested and worked on or have a mechanism that allows the equipment to be removed from the power supply prior to being dismantled and worked on.

All electrical equipment in hazardous areas must have periodic detailed inspections carried out on them (by law) As these are detailed inspections requiring all components of the equipment to be inspected, all power must be removed from the equipment so this may be carried out.

The time taken to carry out these inspections is substantial and extremely costly as the electricians must be specially trained to carry out these checks and maintenance.

The type of light fittings used in hazardous areas are big, bulky fittings. Added to this cost is the high maintenance aspect of the fittings.

Further, in order to constrain carbon emissions, control of electrically powered appliances is desirable. This may be in an attempt to decrease power consumption and/or to take into account varying power availability at certain times. As electricity generation becomes more decentralized and more power is derived from renewable sources the need to control such an appliance becomes more apparent at all levels: industrial, civic and private.

The present inventors developed an interest in inductively powering apparatus to attempt to address at least some of these issues.

A number of proposals have been put forward to power appliances in the lighting field and other fields including a family of related inventions by inventor Baarman and others such as US 20030201731, US 200030214255, US 20030214257, US 20040164686, US 2006 0284713, US 20070085487 and US 20100072826. The Baarman inventions concern inductively coupled power to devices mainly in the field of UV sterilization of water. US 20070085487, for example primarily relates to a ballast circuit but mentions an inductive coupling and refers to optical control of the shorting device for start up of the UV lamp.

WO 2001 016995 by inventor Haynes discloses a split transformer in which the secondary is attached to an illuminable item such as a drinks coaster or poker chip and the primary side is present on a table. The power supply is continuous and when the coaster or poker chip is placed on the table it lights up.

WO 2003 009653 by inventors Bucks and Nijhof relates to a power supply arrangement driving for a LED aimed at reducing EMI interference by a particular switching regime.

EP E0478306 Kakitani discloses an apparatus for providing stable DC power for a control circuit to operate a discharge lamp with a primary and secondary inductive winding.

DE202004014497U1 by inventor Yen discloses an inductively powered LED lamp for use in a water filled vessel with primary and secondary windings.

Other proposals using varied appliances have also been put forward. For example CN201535441 relates to a battery powered "intrinsically safe work lamp", CN 201083345 discloses inductively rechargeable battery powered torch and CN 201263620 relates to an inductively powered lamp on a cordless kettle.

While particular proposals relating to lighting such as by inventors Limpkin and Rozenberg have been put forward, there are doubts about whether these would be practical for operating the appliance. For example WO2004/097866 appears to disclose a two part induction coupling linking an AC winding on a half core of a split transformer to a secondary winding connected to a load such as a lamp.

Yet other disclosures such as U.S. Pat. No. 6,188,179 by inventor Boys relate to a transformer for use with fluorescent lights in environments where arcing is undesirable. In this system a primary coil may be run around the cabin of a boat, for example and when light is required a fluorescent lamp attached to a C-shaped coil, acting as the secondary winding is hooked over the primary coil. The primary coil carries current in the order of 60 A requiring specialized fit out. While arguably this allows the connection/disconnection of the lamp without danger it does not provide a system which would be easily adapted to everyday use in homes, offices or industrial sites.

In a completely different field Japan Patent Application 2000-252145 by inventor Kuki Heiji discloses a two part induction connector in which there is optical communication between the primary and secondary sides. The connector is designed to be permanently incorporated in the door or of a van and allows powering of the windscreen wiper and indicator light upon opening and closing of the van door.

The above references to and descriptions of prior proposals or products are not intended to be, and are not to be construed as, statements or admissions of common general knowledge in the art.

The present invention attempts to overcome at least in part the aforementioned difficulties associated with operating, controlling and maintaining electrical appliances including industrial lamp fittings.

DISCLOSURE OF THE INVENTION

In one aspect the present invention provides a coupling for use with an appliance operated by a power supply, which coupling allows mounting/dismounting of the appliance without electrical isolation from the supply said coupling comprising:

a) a mounting member having a first encapsulated transformer element and suitable controls connectable to the power supply, said member being suitable for fixing to a structure; and b) a holder member engageable with said mounting member, wherein the holder member is suitable for holding or for connecting thereto an appliance, said holder member having other suitable controls and a second encapsulated transformer element able conduct power to an appliance; c) wherein engagement of the first and second members is able i) to cause induction of current in the second encapsulated transformer element enabling powering of an appliance and ii) is able to cause a signal to be carried between the controls and an appliance to control and/or monitor the appliance; and wherein disengagement of the first and second members results in no induction and no carriage of the signal.

power direct from the power source in order to operate and includes lamp fittings, instrumentation, electrical motors, process control/instrumentation devices, flow control valves, modems, electricity meters, smart meters and submeters such as the Shark 100-S™ from Electro Industries/GaugeTech and status indicators i.e. proximity switches, pressure switches, flow indicators, valves, pH meters and the like.

The term "a power supply" refers to an electrical power supply or source such as a mains supply, generator supply, or photovoltaic supply of electricity and includes an extra low voltage (ELV) supply. The term also includes a combined power and/or signal overlay such as a high frequency control signal.

The term "mounting and dismounting without electrical isolation" refers to the fact that the circuit on which the appliance is wired does not have to be disconnected or switched off to The term "appliance" refers to refers to any piece of electrical equipment which consumes protect a worker when placing the fitting, replacing the fitting or otherwise handling or carrying out maintenance on the fitting. The invention allows for easy, convenient mounting/dismounting of the appliance.

The term "mounting member" refers to a component of suitable form and strength to support the appliance such as a lamp fitting.

The transformer elements are part of a transformer. A transformer is an appliance for transferring electrical energy from one electrical circuit to another. While in the traditional transformer it is desirable for the elements to be in physical contact in the present invention the transfer of energy occurs without direct electrical contact between the transformer elements themselves. Thus while the mounting and holder members come into physical contact upon engagement with each other, the transformer elements do not come into physical contact with one another but nonetheless are in close physical proximity sufficient to allow induction of current. The circuit windings are insulated with lacquer or other insulating material.

The term "first encapsulated transformer element" refers to the primary winding of the transformer connectable to the power supply and comprises a coil of conductive material. This may be in the form of copper wire. Alternatively, printed material such as multilayer printed circuit board (PCB) coils may be used.

The term "encapsulated" refers to the transformer element being encapsulated or sealed within an appropriate medium such as a suitable non-conductive resin, polymer or plastic.

Similarly the term "second . . . transformer element" refers to the secondary side winding of the transformer and comprises a coil of conductive material. The second encapsulated transformer element is connectable to and able to power the appliance.

The terms "suitable controls" and "other suitable controls" refer to circuitry or other means which are able to control or regulate the light fitting or other appliance. For example the control circuitry may operate to regulate the supply of power and/or control operation of the lamp or other appliance. The control circuitry may transmit to and/or receive signals, communications or data from the first and second members or components thereof. Suitable control circuitry may include central processing units (CPU) and associated circuitry. Preferably the CPU and associated circuitry enable the appliance to work in a range of power supplies such as a range of 110 to 240V.

The term "connectable to the power supply" refers to the first encapsulated transformer element having the appropriate fittings to be wired to the power supply when the coupling is installed for use.

The term "suitable for fixing to" in relation to the mounting member means that it is suitable to be mounted on, secured to, or fixed to a structure, such as the spigot mounting on a lamp post or directly to a wall or building.

The term "structure" refers to any structure or support on which an appliance such as a lamp fitting may be mounted such as a spigot in the case of lighting at mining sites, street lamp posts and includes other structures such as a larger piece of equipment of which the appliance forms a part and, also includes planar structures as on buildings or walls, or a purpose built bracket.

The term "a holder member engageable with said mounting member" means that these members are suitable for joining together or otherwise engaging with each other. Preferably the holder member is fixable or securable to the mounting member.

The term "suitable for holding, or connecting thereto, an appliance" means that the member is configured so as to hold or support the appliance such as a lamp fitting, or is configured so as to enable a connection to be made, via a cable or the like, between said lamp fitting or other appliance and the power supply.

Similarly the term "able to conduct power to an appliance" in relation to the second encapsulated transformer element means that the element has the appropriate fittings to allow current to flow to the lamp or other appliance when induction of current occurs between the two elements.

The term "engagement of the first and second members is able to cause induction of current in the second encapsulated transformer element enabling powering of the appliance" means that, when engaged, the first and second members are configured such that current is able to pass from the first transformer element to the second transformer element without direct electrical contact between the elements.

The term "is able to cause a signal to be carried between the controls and an appliance" means that engagement of the two members enables carriage, conveyance and or transmission of a signal between the control circuitry and the appliance. A signal includes a control signal, a command or instruction issued from a controller to the lamp fitting or other appliance. This can be by direct means such as by a signal which travels along the power supply to the appliance via the coupling in the form of an appropriate voltage or high frequency overlay issued by a control device such as a programmable logic controller (PLC) or a data control system (DCS) to appliance connected to the holder member. The signal may also be provided by other non-contact means such as optical transmission or radio frequency (RF) including WiFi.

The term "between" refers to one way or bidirectional travel of signals. Preferably the coupling of the present invention is able to convey a reply signal from the appliance back to the control device indicating that the device is operational or that the control signal has been received. Thus in a preferred form of the invention the coupling may operate as a conduit for operational communications and feedback between an appliance and a control centre. Preferably the control signal is an optical signal, more preferably an infrared (IR) signal.

The term "to control and/or monitor the appliance" means to cause the appliance or a factor relating to the operation of the appliance such as current to be controlled or modulated. Monitoring includes sensing the presence/absence of the appliance and its functioning.

The term "disengagement" in relation to the members refers to disengagement sufficient to stop current flowing between the transformer elements and/or sufficient to stop the signal passing between the transformer elements. Preferably disengagement of the members results in loss of a feedback loop signal from the second member and allows for sensing of presence of absence of the appliance via sensing engagement/disengagement of the second member. Depending on the type of signal used transduction may cease before signal transmission as the members are progressively pulled apart.

An advantage of the coupling of the present invention is that it is contactless and therefore there is no opportunity for arcing on disconnection or reconnection. In addition the invention provides for easy connection/disconnection of the appliance from the power supply. Thus the coupling allows safe disconnection under full power load.

The encapsulated transformer elements may be provided by a suitable configuration. Preferably the encapsulated transformer elements are provided by a first core and having a primary winding and a second core having a secondary winding, where the cores are disposed face to face when the coupling is engaged. The windings may be toroidal in configuration. Alternatively the encapsulated transformer elements may be provided by a male component made of a core and having a primary winding and a female component having a secondary side winding, where the female component present in the member sits over the male component. Alternatively, the arrangement may be reversed with the primary winding in the female component and the secondary side winding in the male component.

Preferably the signal of the coupling of the present invention is carried by a communications path between controls of the first encapsulated transformer element and the other controls of the second encapsulated transformer element. Preferably a communications path is provided between the face to face annular cores and the members are configured so to align the path when engaged. Preferably the path comprises an axis perpendicular to the faces of the cores and runs through the centres of the cores. Even more preferably the there is a feedback loop between the two elements allowing compensation for variable induction efficiency which may be caused by varying mechanical tolerances when the first and second members are manufactured and/or engaged/disengaged during use.

Preferably the communications path is provided by an optical (including non-visible light) means. The optical means preferably involves use of light in the infrared range. Preferably the light passes through a light pipe or light tube. This provides a low cost and reliable means of signaling.

Preferably the coupling of the present invention is suitable for use with any electrical appliance but particularly lamp or light fittings. The term "lamp fitting" refers to an appliance which contains a lamp such as an incandescent, fluorescent, light emitting diode (LED) or other type of lamp and a lamp holder and also includes luminaires. The term may also include control equipment such as the ballast, the reflector, the diffuser and other components making up the fitting. More preferably the coupling is suitable for use with industrial and/or commercial lamp fittings.

The term "industrial and/or commercial" refers to lamp fittings which are non-domestic in nature and are generally specialized bulky and/or heavy lamp fittings used in workplace, commercial and public settings generally as opposed to domestic or home-based situations. It encompasses mining sites, roadways, tunnels, parking lots including multi-storey parking lots, buildings such as factories, sporting facilities and venues other settings where industrial or commercial scale lighting is required. More preferably the coupling is used with lamp fittings comprising LEDs wherein the current in the second encapsulated transformer elements is set between minimum and maximum parameters suitable for the particular LEDs.

A further advantage of the present invention is that the coupling is non-arcing and can be used safely in environments where hazardous conditions exist such as explosive dusts and gases in mining, petrochemical industries, food factories and bakeries where flour or other dried ingredients may form explosive dust clouds and wet environments even in fully submerged environments such as swimming pools. The coupling may be also used with lighting at sites where inclement weather or other conditions make lighting maintenance difficult. A particular advantage of the present invention is that it avoids the need for compliance with costly and complicated procedures in electrical maintenance such as isolation of circuits when working in combustible or otherwise hazardous environments.

In another aspect the invention provides a method of manufacture of coupling for use with an appliance operated by a power supply, which coupling allows mounting/dismounting of the appliance without electrical isolation from the supply said method comprising producing a coupling:

by assembling a) a mounting member comprising a first encapsulated transformer element and suitable controls connectable to the power supply, said member being suitable for fixing to a structure;

and by assembling b) a holder member engageable with said mounting member, wherein the holder member is suitable for holding or for connecting thereto an appliance, said holder member having other suitable controls and a second encapsulated transformer element able conduct power to an appliance; c) wherein engagement of the first and second members is able i) to cause induction of current in the second encapsulated transformer element enabling powering of an appliance and ii) is able to cause a signal to be carried between the controls and an appliance to control and/or monitor the appliance; and wherein disengagement of the first and second members results in no induction and no carriage of the signal.

In another aspect the present invention provides a method of operating and controlling an appliance by inductively coupling the appliance to a power supply via a coupling which coupling allows mounting/dismounting of the appliance without electrical isolation from the supply said method comprising providing a coupling comprising:

a) a mounting member having a first encapsulated transformer element and suitable control circuitry connected to the power supply; and b) a holder member engageable with said mounting member, wherein the holder member holds or has connected thereto an appliance, said holder member having suitable control circuitry and a second encapsulated transformer element able conduct power to the appliance; c) wherein engagement of the first and second members i) to causes induction of current in the second encapsulated transformer element thereby powering the appliance and ii) causes a signal to be carried between the control circuitry and the appliance to control and/or monitor the appliance; and wherein disengagement of the first and second members results in no induction and no carriage of the signal.

In another aspect the invention provides an improved method of mounting an appliance operated by a power supply, which method allows mounting/dismounting of the appliance without electrical isolation from the supply said method comprising: providing a) a mounting member having a first encapsulated transformer element and suitable controls connectable to the power supply, said member being suitable for fixing to a structure; and engageable with said mounting member, b) a holder member suitable for holding or for connecting thereto an appliance said member having a second encapsulated transformer element and other suitable controls able conduct power to the appliance; c) wherein engagement of the first and second members is able i) to cause induction of current in the second encapsulated transformer element enabling powering of an appliance and ii) is able to cause a signal to be carried between the controls and an appliance to control and/or monitor the appliance; and wherein disengagement of the first and second members results in no induction and no carriage of the signal; and fixing said mounting member to a structure, connecting it to the power supply, engaging the holder member and associated appliance with the mounting member.

In another aspect the invention provides an improved method of maintenance of lamp fittings or other appliances operated by a power supply which method allows mounting/dismounting of the fittings or other appliances without electrical isolation from the supply said method comprising: provision of lamp fittings or other appliances associated with couplings each coupling comprising a) a mounting member having a first encapsulated transformer element and suitable controls connectable to the power supply, said member being suitable for fixing to a structure; and b) a holder member engageable with said mounting member, wherein the holder member is suitable for holding or for connecting thereto an appliance, said holder member having other suitable controls and a second encapsulated transformer element able conduct power to an appliance; c) wherein engagement of the first and second members is able i) to cause induction of current in the second encapsulated transformer element enabling powering of an appliance and ii) is able to cause a signal to be carried between the controls and an appliance to control and/or monitor the appliance; and wherein disengagement of the first and second members results in no induction and no carriage of the signal the improvement comprising that replacement of lamp fittings or other appliances can be carried out under full power load by disengaging said the holder member and replacing it with a fresh lamp fitting or other appliance attached to a second holder member directly, or via a cable.

Preferably the mounting member and the holder member when engaged form a protective housing to help protect the outside of the encapsulated elements from dust, dirt, moisture and the like. Even more preferably the housing is weather resistant. This means that the housing protects against the elements and is resistant to ingress of moisture and/or dust, dirt and the like. Still more preferably the housing is weather proof and can be hosed down with high pressure water jets to facilitate cleaning of the lamp fitting in situ.

Still more preferably the elements are engageable through 360° of rotation about a longitudinal axis of the housing. Even more preferably the members are of suitable dimensions such that engagement is provided by one part of one member sliding over another part of the other member. Preferably at least a part of one of the members comprises a substantially cylindrical sleeve wherein optionally the wall of the cylinder may be inclined or tapered. Still more preferably a part of the holder member slides over a part of the mounting member thus when slidingly engaged the coupling is able to support the weight of the light fitting enabling one-handed engagement and disengagement of the members. Still more preferably the one of members is suitably threaded and that members are fixed together by a complementary threaded annular element such as a locking ring.

Even more preferably the holder member and light fitting form an integrated unit suitable for coupling with the mounting member. Still more preferably the lamp is an energy efficient lamp such as LED. As such maintenance may be carried out in any weather condition. The integrated fitting and coupling is fully sealed thus negating the need for detailed inspections. The lamp comprises LEDs making it maintenance free for at least 5 years. The sealed coupling allows for light fitting replacement within 30 seconds with no need for permits, gas tests, or any specialist equipment. Due to having no exposed terminals at all and having no need to disconnect any wiring the light fitting can be replaced by anyone. There are no special skills or licenses required other than either general or generic site or area inductions or training pertaining to working in hazardous areas, once the coupling has been initially connected to the junction box or similar appliance supplying the power. All the above will reduce maintenance costs and time considerably in most cases once the coupling is installed by 98%

Depending on the safety regulations in the country concerned, maintenance of a light fitting at an industrial or commercial site may require a hazard analysis to be carried out, a permit to be issued for the work and a certificate of compliance to be completed once the work has been carried out. Further most safety standards require that the light fitting the electrically isolated which in itself may present a difficulty. Many industrial sites do not keep accurate records and circuit identification is difficult. In addition for light fittings mounted at height it is necessary to access them with a scaffold, cherry picker or platform ladder. As some occupational health and safety standards require a worker to maintain three points of contact with a secure base when working from a stepladder or similar appliance, only one hand is available to perform tasks such as removal of a light fitting. For all these reasons, it is common on industrial and mine sites for example for 20% of the light fittings to be out of service at any one time.

In another aspect the present invention contemplates a method of providing proximity activated control of luminescence in at least one lamp comprising providing: a lamp fitting operated by a power supply and mounted on a structure in a location, wherein the lamp is associated with a coupling which allows mounting/dismounting of the lamp without electrical isolation from the supply, the coupling comprising a) a mounting member mounted on a structure having a first encapsulated transformer element and suitable controls connected to the power supply and a wireless digital radio transceiver associated with said controls; b) a holder member engageable with said mounting member, wherein the holder member holds or has connected thereto a lamp, said holder member having other suitable controls and a second encapsulated transformer element able conduct power to the lamp; c) wherein engagement of the first and second members causes i) induction of current in the second encapsulated transformer element to power the lamp; and ii) is able to cause a signal to be carried between the controls and lamp to control and/or monitor the lamp; and wherein disengagement of the first and second members results in no induction and no carriage of the signal; and d) wherein luminescence of the lamp is controlled by a remote controller via the radio transceiver said remote controller being operational within a predetermined distance from the coupling and/or manually.

Manual operation is used in certain circumstances including where it is desired to override the proximity control where for example a person has not been issued with a transponder.

The location may be an industrial site, mining site, school grounds or the like where lamp posts are fitted with lamps associated with the coupling. Preferably the remote controller is present on a key fob carried by a person or vehicle moving around the site. Luminescence may be controlled by the lamps being turned on, brightened or dimmed depending on where the light is needed.

The present invention is partly predicated on the recognition that employing a coupling which acts as a transformer with encapsulated elements enables many issues with lighting installation, control and maintenance to be addressed.

It has also been realized by the inventors that the coupling of the present invention when fitted with a suitable communications means may provide a network such as a communications SCADA (Supervision Control and Data Acquisition) network.

Thus in another aspect the invention provides a method of providing a distributed supervision control and data acquisition network for controlling appliances remotely comprising providing: lamp fittings or other appliances operated by a power supply and mounted on power poles or other structures in a location and wherein the appliances are associated with couplings which allow mounting/dismounting of the appliances without electrical isolation from the supply, each coupling comprising a) a mounting member mounted on a power pole or other structure having a first encapsulated transformer element and suitable controls connected to the power supply; b) a holder member engageable with said mounting member, wherein the holder member holds or has connected thereto the appliance, said holder member having other suitable controls and a second encapsulated transformer element able conduct power to the appliance; c) where one of the members includes a wireless digital radio transceiver able to receive signals from and transmit signals to couplings attached to other poles or structures within range and receive signals from and transmit signals to a control station; d) wherein engagement of the first and second members causes i) induction of current in the second encapsulated transformer element to power the appliance; and ii) is able to cause a signal to be carried between the controls and the appliance to control and/or monitor the appliance; and wherein disengagement of the first and second members results in no induction; and e) wherein the coupling is able to receive signals from and transmit signals to the control station allowing remote control of the appliance in b) or another appliance associated with the network.

The "location" may be an industrial site, a locality such as a municipal council, a city, a road or a network of roads or highways.

Preferably digital radio transceiver is incorporated in the mounting member.

Preferably the control station is operated by the power authority, municipal council or other body.

BRIEF DESCRIPTION OF THE DRAWINGS

The invention will now be described with reference to the following non limiting illustrative drawings.

DETAILED DESCRIPTION OF ILLUSTRATIVE EMBODIMENTS OF THE INVENTION

The invention will now be described with reference to the following non limiting drawings which relate to use of the connector with an industrial light fitting similar to the integrated light fitting disclosed in International Patent Application No PCT/AU09/filed 31 Aug. 2009 claiming priority from provisional patent application number 2009 9033765 filed on 20 Jul. 2009, which are herein incorporated by reference. It will be understood however that the coupling of the present invention can be used with other appliances operated by a non-battery power supply such as power driven instrumentation appliances and electrical motors, controls, valves, junction boxes and process instrumentation as in a flow meter in a pipe rack and the like.

Figure 1:
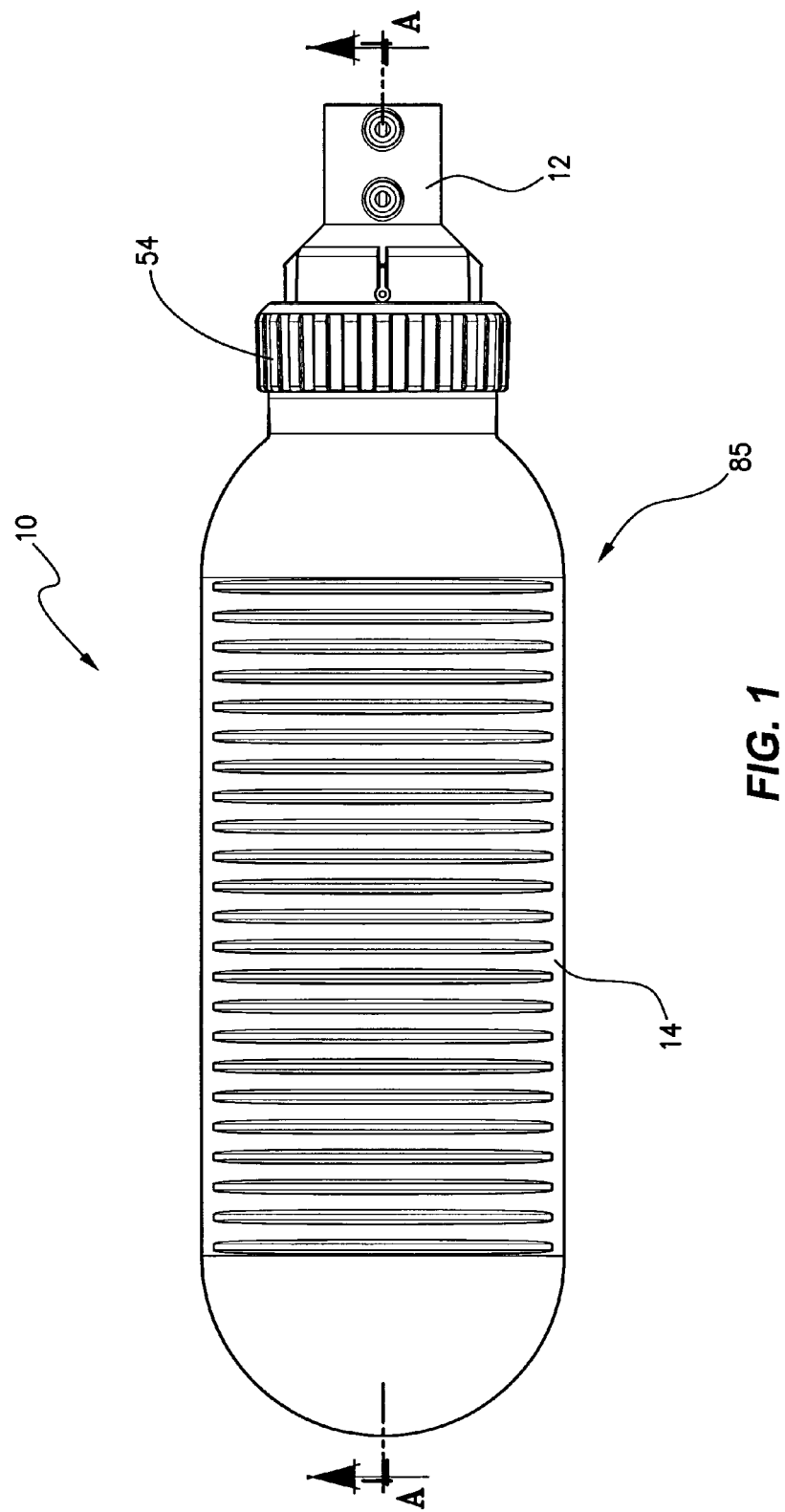
FIG. 1 is a top view of the coupling the present invention in use with a lamp fitting. The holder member and lamp fitting are in the form of an integral unit.

FIG. 1 shows the coupling 10 of the present invention in the form of mounting member 12 and holder member in the form of an integrated unit comprising lamp and lamp holder 14 which together form protective housing 85.

Figure 2:
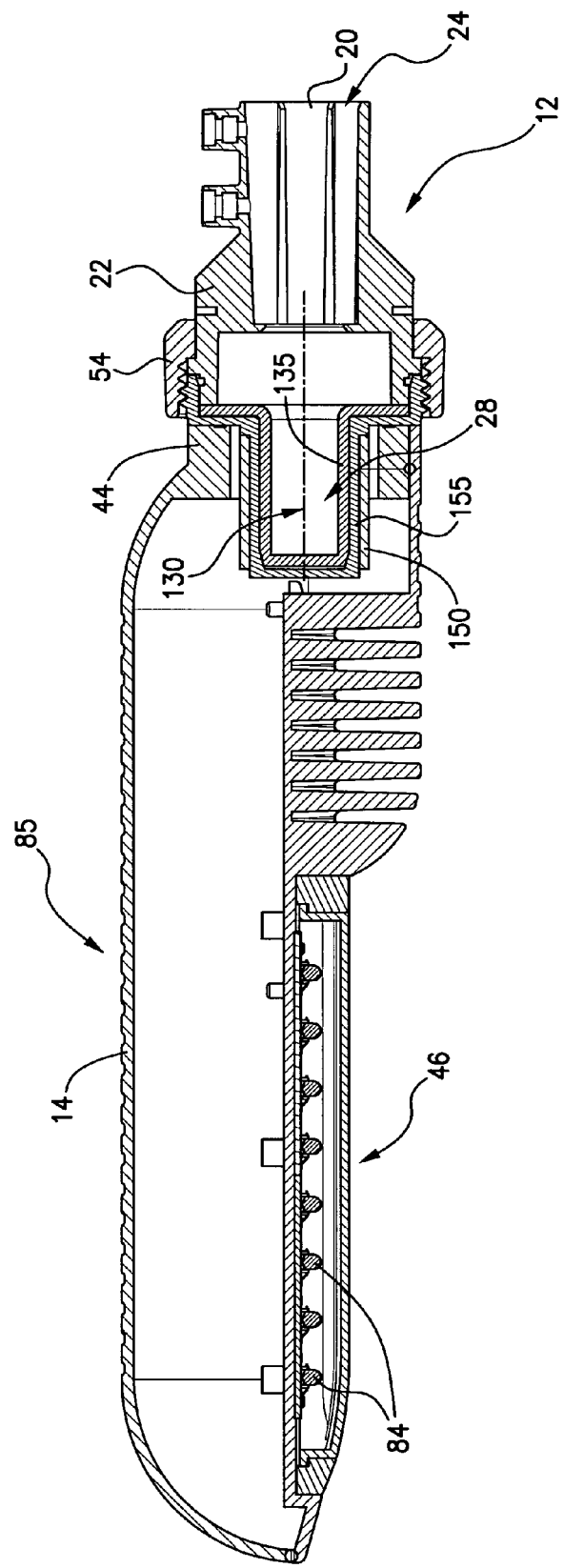
FIG. 2 is a sectional view of the section A-A FIG. 1 showing the male/female arrangement of the transformer.
Figure 3:
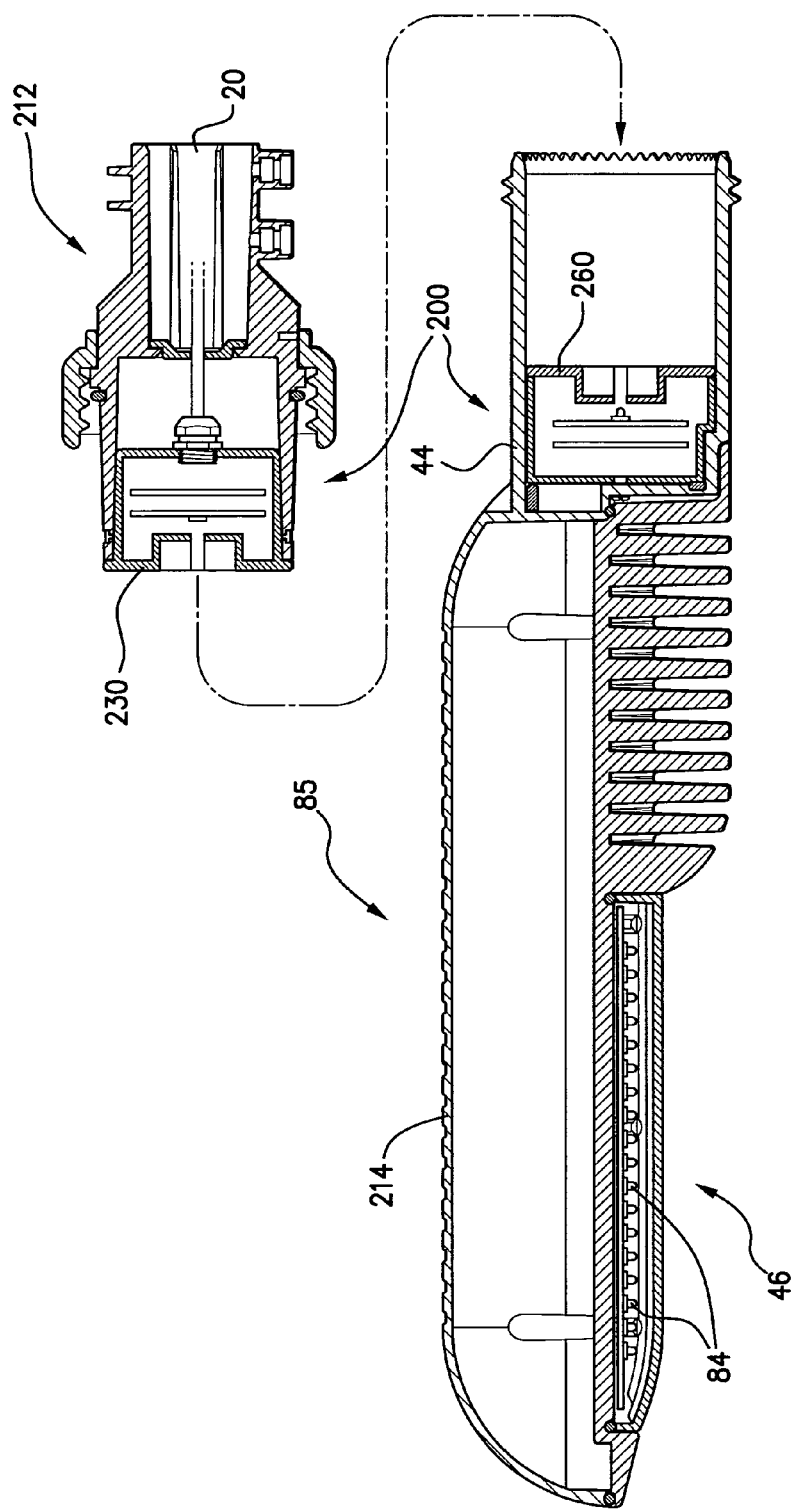
FIG. 3 is a schematic representation of another embodiment of the invention.

FIG. 2 shows mounting member 12 having cylindrical sleeve 22 with open end 24 for receiving spigot 20 containing electrical wiring (not shown) from the power supply. Spigot 20 is part of a conventional mounting on a pole or the like for a lamp fitting. At opposite end 28 of mounting member 12 there is provided first encapsulated transformer element 130 in the form of a first winding body and core (not shown) encapsulated within an appropriate nonconductive resin or other appropriate material. Encapsulated transformer element 130 is configured as a male component or projection 135.

Light holder 14 comprises lamp fitting 46 having a plurality of LED 84 and at one end cylindrical element 44. Second encapsulated transformer element is provided by second winding body 150 which sheaths female component or recess 155. Recess 155 is disposed partly within cylindrical element 44 and partly within the body of the lamp fitting.

When holder member 14 and mounting member 12 are engaged projection 135 mates with recess 155 allowing induction of current in second encapsulated transformer element 150 thus enabling powering of the lamp. The two members are fixed together by screwing up locking nut 54. Upon disengagement and physical separation of holder member 14 and mounting member 12 there is no flow of current between the elements. This allows safe disconnection of the holder member 14 from mounting member 12.

The coupling provides the contactless connection by using the process of induction as provided by transformers. This is achieved by having one half of the transformer encapsulated in a body containing resin or other suitable material and the other half of the transformer in a body containing similar resin or other suitable material. The power is supplied permanently to the first half. When the two halves are placed together and secured then the coupling as an assembled unit acts as a transformer and allows current to flow from the secondary side of the transformer windings thus powering up and turning on the light. When the two halves of the coupling are separated then each half discontinues to act as a transformer thus causing the light to turn off and allowing it to be removed and replaced if required. The light fitting itself houses and array of low voltage LEDs making the fitting extremely well suited for hazardous areas. The low voltage is achieved by having the transformer made up of the coupling being designed and wound so as to "step down" the voltage i.e. 240 volts is supplied to the primary of permanently mounted side of the coupling and the windings are such that when coupled with the second half of the coupling the voltage is stepped down to a lower voltage e.g. 24 volts, via the transformer design allowing the use of low voltage LEDS to create the illumination. The transformer elements of the light are filled with epoxy resin or other suitable material so as to allow all contact points be encapsulated and thus negating the need for a detailed inspection at any stage of the fittings life.

BEST MODE OF CARRYING OUT THE INVENTION

Similarly the second embodiment of the invention shown in FIGS. 3 to 9 relates to a coupling 200 for driving an LED light fitting from the mains supply without a galvanic connection. As in the first embodiment, coupling 200 comprises mounting member 212 (primary side) and the holder member 214 (secondary side). Primary side 212 is designed for permanent connection to a power source. The energy to drive the secondary side is coupled magnetically through a split transformer arranged in a face to face configuration as distinct from the male/female arrangement in the first embodiment. The secondary side contains LEDs and an internal magnetically coupled power supply which is mechanically connected to the primary side but galvanically isolated. This means that the secondary side is removable during operation without the need to disconnect power to the primary.

The face to face arrangement was found to be advantageous in that it negates the need for precise engineering of components and allows use of readily available parts such as ferrite cores for the transformer.

In the second embodiment an optical communications path allows digital data exchange between primary and secondary sides either unidirectionally or half-duplex bidirectionally. This communications path enables power feedback, identification, dimming, blinking, colour changes, temperature as well as other information or signals to be exchanged between primary and secondary side.

As will be explained in the following description, the electronics is designed so it can cope with a wide range of mains voltages, detect the presence or absence of the secondary side and compensate for varying secondary side loads and magnetic coupling efficiencies. The combination of features (viz a CPU and a communications path) allows the coupling to compensate for imperfections in the cores, misalignments of the two halves and power supply variations (such as allowing use with 110 and 240V supplies).

Figure 4A:
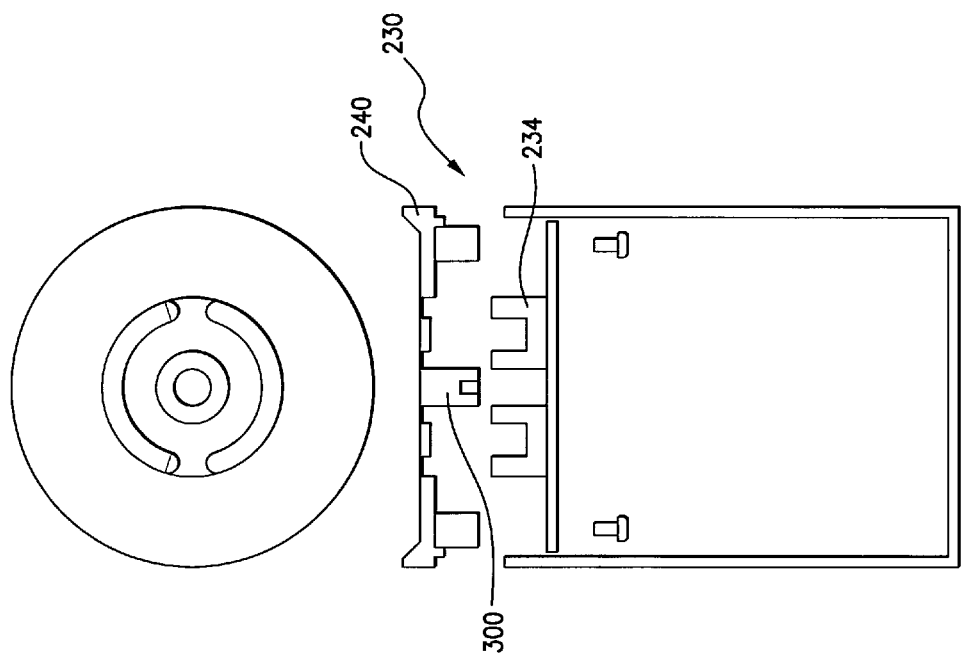
FIG. 4a is a schematic representation of the coupling of the present invention.
Figure 4A:
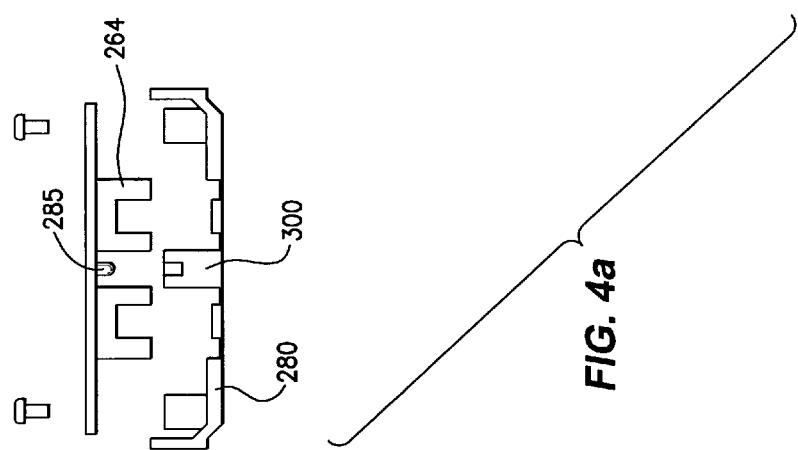
Figure 4B:
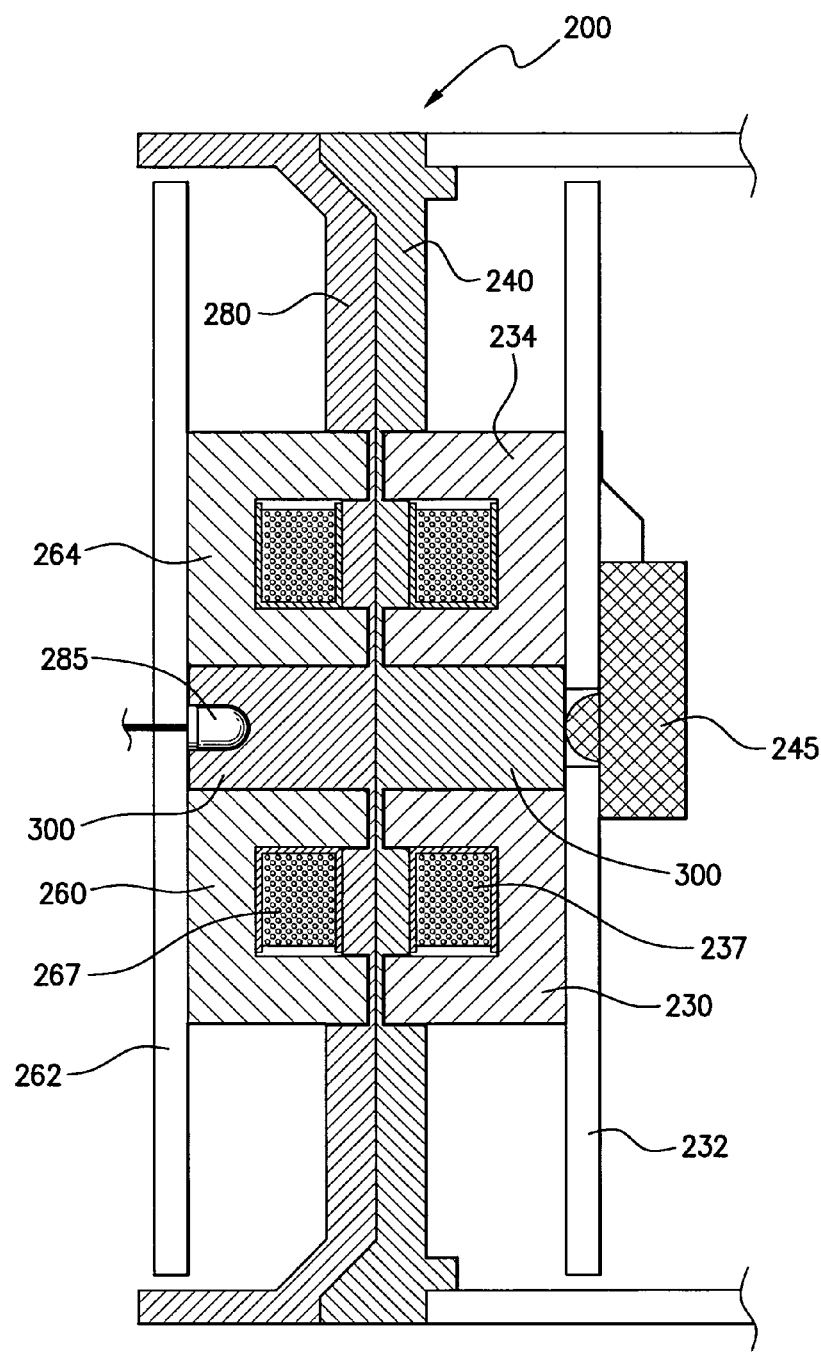
FIG. 4b is a sectional partial view of the two parts of the coupling when engaged.

The basic principle of the magnetic and optical coupling between primary and secondary sides may be seen from FIGS. 4a and b. The transformer comprises two standard ferrite pot core halves 234 and 264. The coils 237 and 267 comprise copper wire wound onto half height custom machined plastic bobbins. Alternatively, multilayer PCB coils may be used.

Translucent plastic end caps 240 and 280 which allow passage of IR (infrared) cover the transformer halves thus providing electrical safety clearance and sealing of the ends of the primary and secondary sides. Optical feedback is via the secondary side LED 285 through light pipe 300, plastic caps 240 and 280 to the primary side IR receiver module 245. PCBs 232 and 262 allow for mounting of the electrical components and the transformer halves. Alternatively PCBs 232 and 262 may be mounted on the end caps 240 and 280 with standoffs that can be part of the end caps themselves. The exterior profile of end caps 240 and 280 are complementary in shape. Exterior of cap 280 has annular filleted projection which fits within a complementary recess on cap 240. These features are designed to self-centre the assembly. All internal voids are filled with a suitable potting compound which would be known to a person skilled in the art to hermetically seal the internal electronics assembly.

Figure 5:
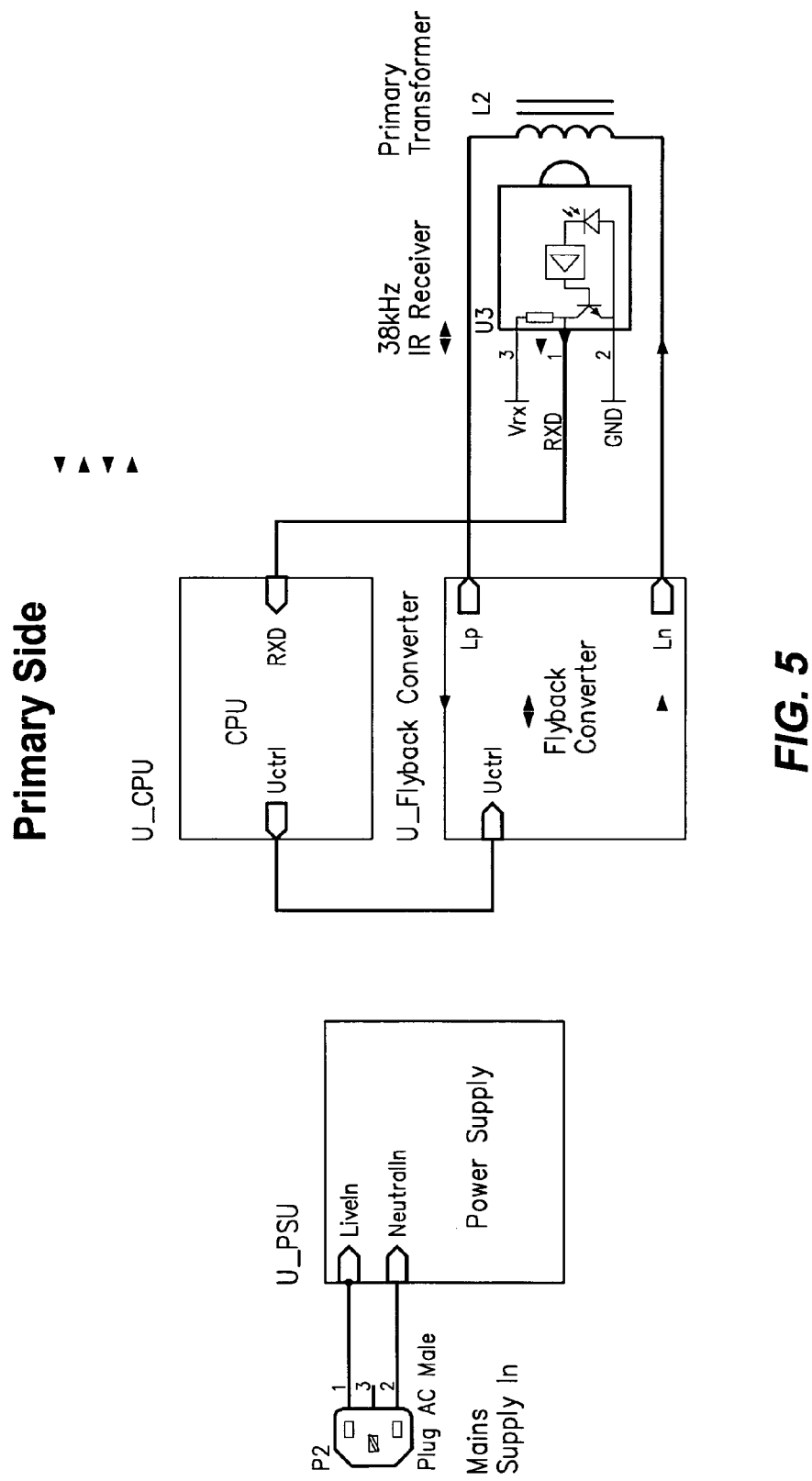
FIG. 5 is a schematic representation of the primary side of the coupling.

The primary side consists of three major blocks: Power Supply, CPU and Flyback Converter as shown in FIG. 5. These three blocks enable energy to be taken from the mains connection and be transferred to the first encapsulated transformer element 230 (see FIG. 4) also referred to as the primary transformer. The other half of the transformer is provided by second encapsulated transformer element 260 (see FIG. 4) also referred to as the secondary transformer.

Figure 6:
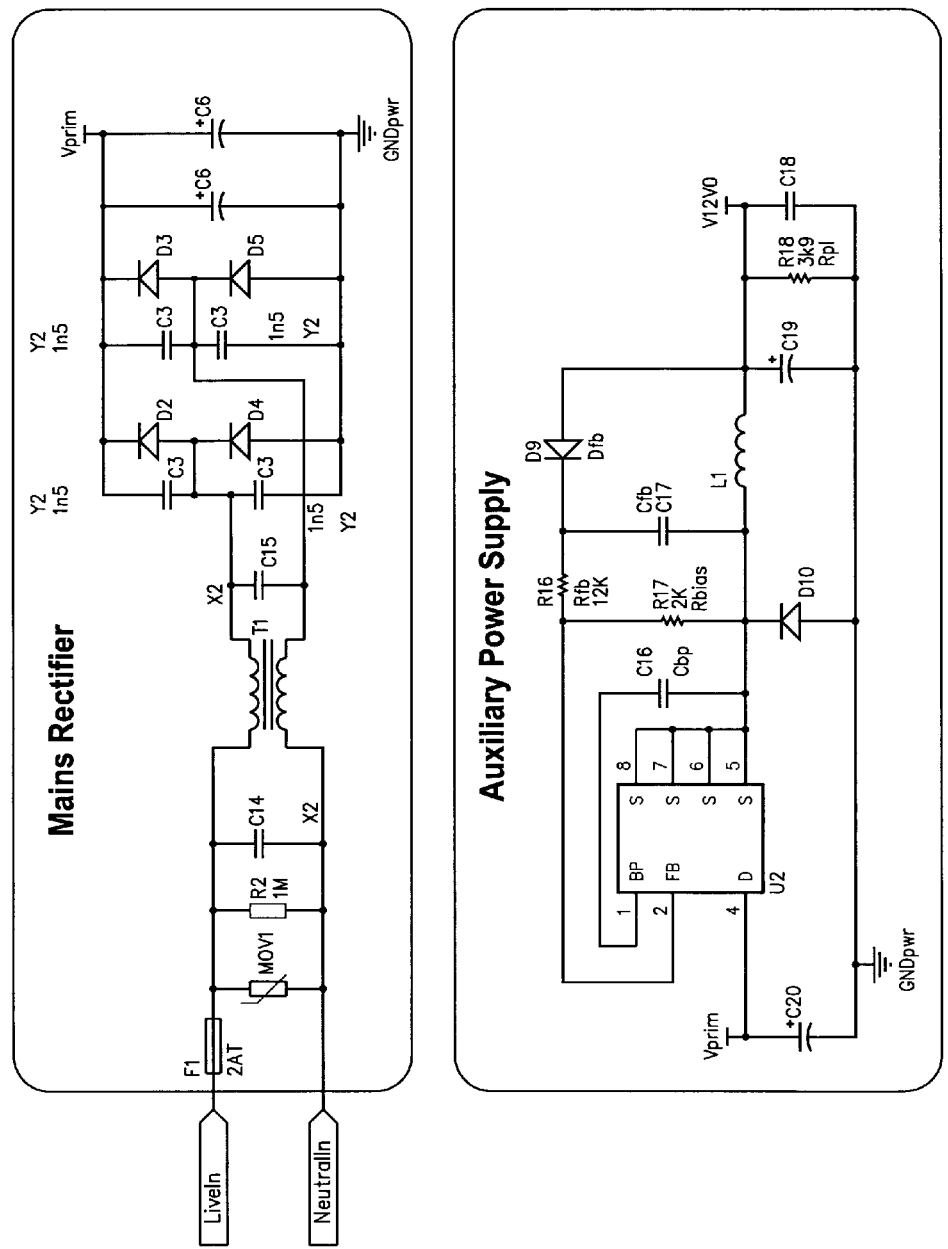
FIG. 6 is a circuit diagram of the mains rectifier and auxiliary power supply of the primary side of the coupling.

The power supply to primary transformer 230 consists of two main blocks as shown in FIG. 6: the mains rectifier, which provides the unregulated main high voltage rail for the flyback converter, and the auxiliary power supply, which provides a regulated low voltage rail for the switchmode controller and CPU.

Referring to FIG. 6, the mains rectifier connection is via the 'LiveIn' and 'NeutralIn' ports. The function of Fuse F1 is a circuit overload protection feature (i.e. to prevent fire and limit the follow-on current in the case of a catastrophic component failure). MOV1 clamps mains induced transient spikes to a safe level. C17, T2 and C18 form an electromagnetic compatibility (EMC) filter to reduce entry of mains borne noise into the unit and also prevent internally generated noise from being transferred to the mains wiring. Diodes D6 to D9 perform a full wave rectification of the mains AC voltage and charge up capacitors C14 and C15 to the peak amplitude of the mains supply voltage (Vprim). C14 and C15 are split into two parallel capacitors to minimise the electrical series resistance and to allow the physical volume to be distributed. C12, C13, C16 and C19 dampen spikes generated by the nonlinearities of the diodes and assist in filtering mains interference.

The Auxiliary power supply, also shown on FIG. 6 uses Vprim and creates a regulated 12V rail (V12V0) with a dedicated low power switchmode buck regulator integrated circuit, IC (U2).

Figure 7:
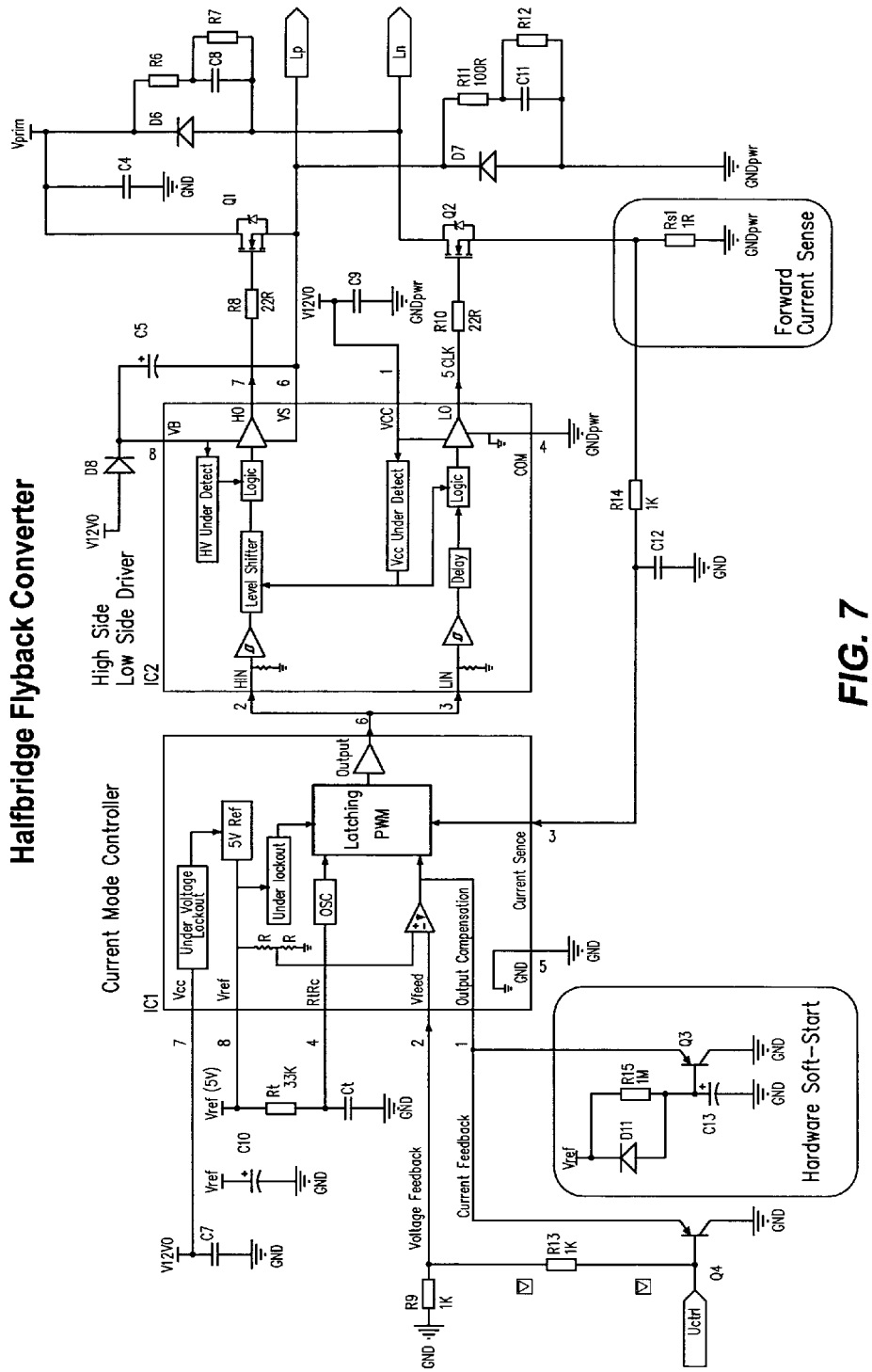
FIG. 7 is a circuit diagram of the fly back converter of the primary side of the coupling.

The flyback converter shown on FIG. 7 uses a halfbridge flyback topology to drive the primary transformer half from the primary voltage rail (Vprim).

The operating principle is as follows: during the forward cycle, MOSFETs Q1 and Q2 are both turned on simultaneously via the highside/low side driver IC2, which in turn is driven by current mode switchmode controller IC1. The current in the primary transformer (L2) coil rises linearly, the rise time being dependent on inductance of L2 and Vprim. This current causes a proportional voltage drop in the current sense resistor Rs1. The dropped voltage is fed back into the control IC1. When the current reaches a preset value, both Q1 and Q2 are turned off simultaneously by IC1. During this flyback cycle, the energy stored in the magnetic field of the primary transformer is now either partially transferred to the secondary side coil if the secondary side is present, or any energy that is not transferred to the secondary side causes the voltage on the primary coil to reverse and forward bias diodes D3 and D4 return the energy to the main supply rail capacitors C14 and C15. A snubber network consisting of R5, R6, R10, R11, C6 and C9 suppresses spikes during the turn-off period and the reverse recovery times of D3 and D4.

Since the energy that is stored in L2 in each cycle is dependent only on the peak current and the inductance of primary transformer L2, the converter represents a constant energy system, irrespective of mains voltage (or Vprim) variations as long as the switching frequency is constant. This allows the system to operate on a wide range of voltages from 110 to 250V nominal. If Vprim rises, the slope of the linear current rise in L2 during the forward cycle will increase and the forward cycle will be terminated earlier, thus maintaining constant energy for each cycle. Current control will also compensate for any tolerances in the inductance of L2, which will vary with the proximity of the secondary side transformer half. Even though the energy levels per cycle will change if the inductance of L2 changes, the peak current for the switching MOSFETs is still well defined. This prevents excessive stress on Q1 and Q2 in the absence of a secondary side transformer half.

Whilst the current mode controlled diagonal half-bridge topology is inherently self-regulating for varying supply rails, mechanical variations in the gap between primary and secondary side transformer halves will change both the leakage of the transformer inductance and the inductance of the primary coil and therefore the amount of energy that gets transferred with each cycle. Preferably when the two sides are mated a gap of around 0.5 mm or less is desirable however the coupling can function with a gap of about 1.5 mm but efficiency is compromised as EMR leaks away.

This issue may be addressed by two control inputs of the IC1 driven by the CPU to compensate for these variations and maintain constant power to the secondary side. Specifically, there are two different methods that can be used to control the duty cycle of the IC1. One is via the voltage feedback pin 2 in which case Q4 is not fitted and a rising control voltage on port Uctrl decreases the pulse width modulation (PWM) ratio and hence reduces the power level of the converter. The second method uses Q4 to reduce the threshold internal current limit comparator of the IC2. In this case R12 is not fitted which means that increasing Uctrl will increase the current limit, whilst reducing Uctrl will decrease it.

The above method is also employed by the circuitry around Q3, which provides a hardware soft-start for the converter to reduce stress during initial power-up of the primary side and to give the CPU time to go through its reset cycle and start executing code before the switchmode converter can overshoot and overdrive the secondary side. The control voltage Uctrl is generated by the CPU. IC2 has an internal 5V reference voltage regulator that is used to power the CPU and the IR receiver.

Figure 8:
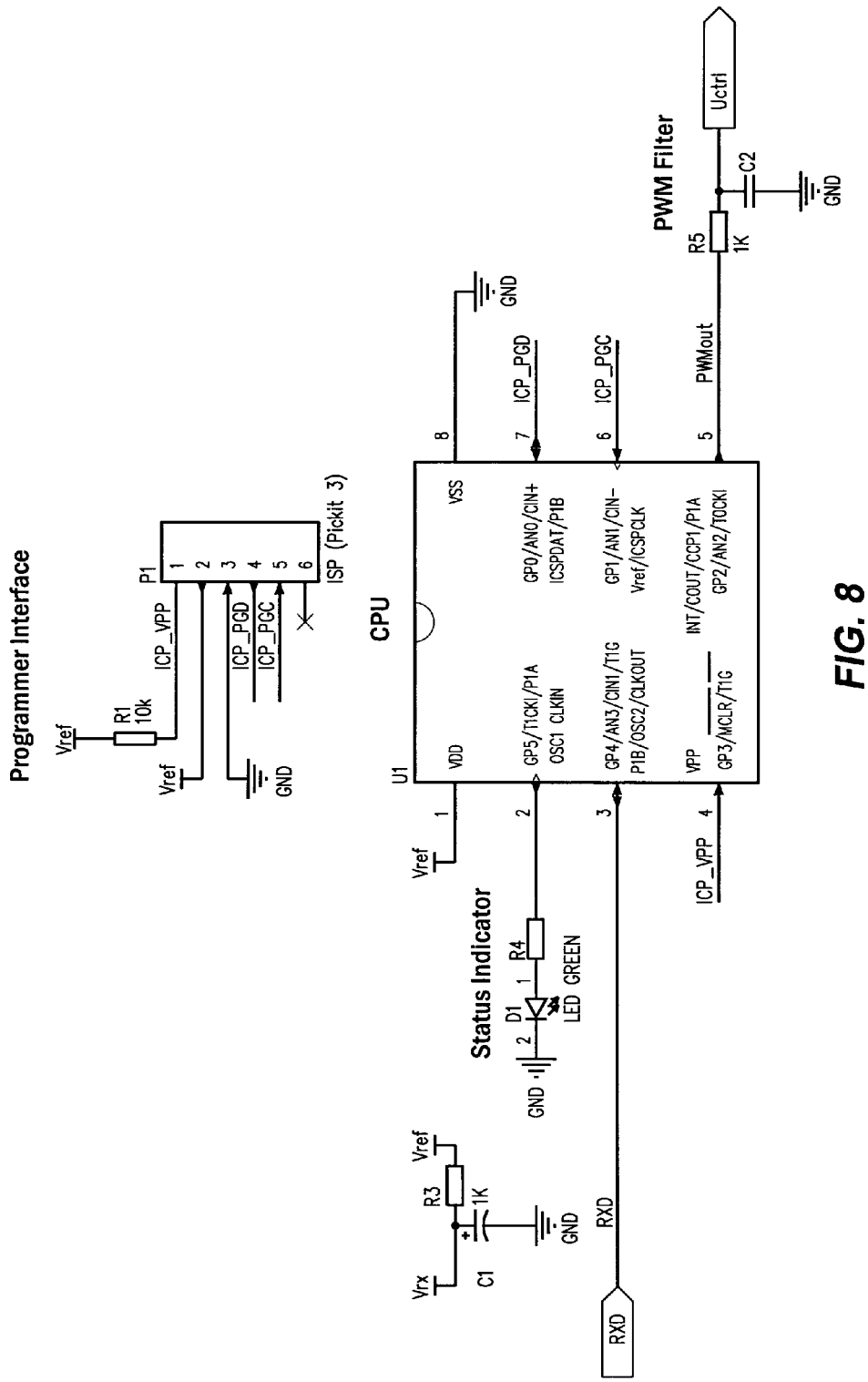
FIG. 8 is a circuit diagram of the central processing unit (CPU) of the primary side of the coupling.

The CPU shown in FIG. 8 is an 8 bit microcontroller with internal oscillator (U1) that is powered off reference IC2 voltage output. The code is loaded into the CPU in circuit via the connector P1. U1 contains a hardware PWM unit that is brought out to Pin5 and generates an analogue control voltage Uctrl via a simple RC filter R4/C2. The digital signals from the IR receiver module are fed into pin 3. Pin 2 can drive an optional status indicator LED. The firmware for U1 is stored in on-board flash memory. On-board EEPROM memory can be used to store serial numbers and/or calibration data.

The basic function of the firmware is to check for the presence of the secondary side on startup. In the simplest case this is achieved by starting the converter for a short period of time and waiting for a data signal on the IR receiver. If no data is received within a timeout period, U1 can turn the converter off for a preset period of time (typically a few seconds) to minimise power consumption and emissions and then retry.

Alternative methods for detecting the presence of the secondary side are using a reed switch connected to an input of U1 that detects the presence of a permanent magnet incorporated into the secondary side, or the use of a reflex photocoupler.

Figure 9:
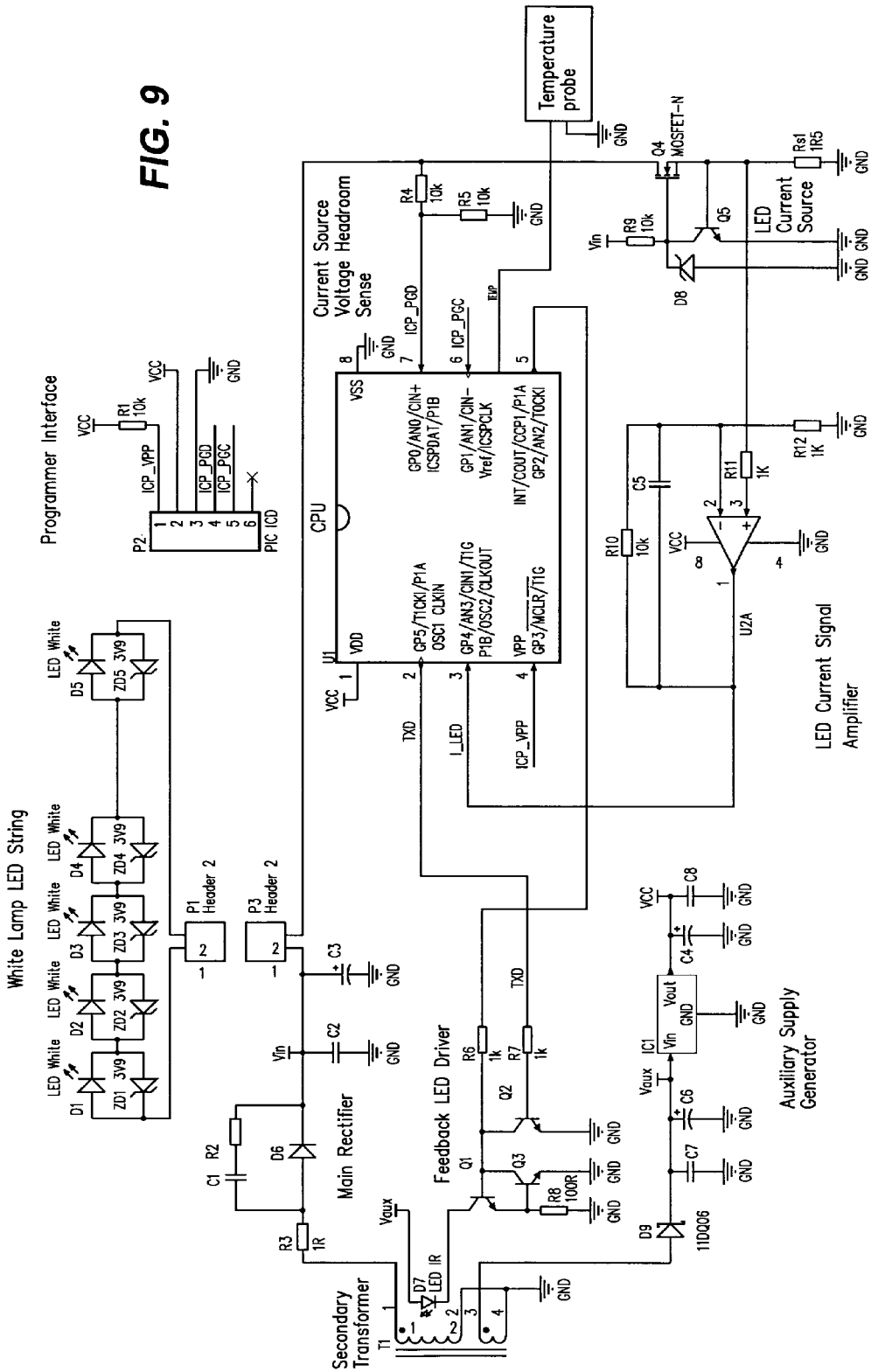
FIG. 9 is a circuit diagram of the secondary side of the coupling.

Referring to FIG. 9 the lamp holder or secondary side uses the other half of the split transformer (T1) to receive energy from the primary side. Feedback to the primary is sent via an IR LED that sends a 38 kHz modulated infra-red signal through an optical light-pipe or light path 300 (see FIGS. 4a and b) to receiver module of the primary 245. Feedback includes information about temperature in the light fitting from a temperature probe.

The energy that is induced into the two windings of the split transformer half T1 during the flyback period of the primary is used to drive a series string of white LEDs from the main winding and to provide an auxiliary supply voltage rail to power the control electronics. During the forward period of the primary side both D6 and D9 are reverse biased and no energy is transferred. As the voltage on the coils of T1 reverses during the flyback period of the primary side, both D6 and D9 become forward biased and charge up C3 and C6 respectively.

The turns ratio is chosen so that the appropriate voltages are obtained for the respective two rails Vin and Vaux. Vin is determined by the number of LEDs in the series string, the type of LEDs and the series/parallel configuration. Typical values for Vin are 30 to 60V. Vaux has to be higher than the minimum input voltage of the 5V linear voltage regulator chip IC1, typically 7 to 10V. The turns ratio may be easily determined by a person skilled in the art.

The string of visible LEDs is driven by a constant current source formed by Q4 and Q5. The voltage drop on current sense resistor Rs1 is proportional to the LED current and limited to a maximum equal to the Base-Emitter threshold voltage of Q5 (typically 500 mV). Operational Amplifier U2 amplifies voltage by a factor of ~10 and feeds it to an analogue to digital (A/D) converter input of microcontroller U1 (Pin 3).

A second A/D input of U1 (Pin 7) is connected to the drain voltage of Q4 and can measure the voltage headroom that is available for the constant current source. PWM output Pin 5 is used to generate the 38 kHz carrier signal for the IR LED, a general purpose input/output (I/O) pin (Pin 2) is used to modulate this carrier. The IR feedback LED is driven by a constant current source formed by Q1 and Q3 and the carrier modulator Q2. In circuit serial programming of the microcontroller U1 is facilitated by connector P2. To keep the LED string current and hence the lamp brightness constant irrespective of split transformer coupling efficiencies, core half separation distances and mains voltage variations, U1 measures the LED current by measuring the voltage drop on Rs1, digitally encoding the current value and sending the signal to the Primary's CPU by modulating the 38 kHz signal with the A/D data. The CPU of the primary side adjusts its switch-mode converter's duty cycle through a software proportional-integral-derivative (PID) controller until the nominal secondary side LED current is achieved.

There are two regulation modes that can be selected in software. In the first mode, the current is regulated to just below the LED Current Source's constant current cut-in value. This is the most energy efficient mode as there is minimal voltage drop across Q4. The main purpose of the constant current source around Q4 is to limit the maximum LED string current to a safe value in the case of a current control loop overshoot, which could otherwise damage the LEDs. Whilst being efficient, the disadvantage of this mode is that short term variations cannot easily be compensated for since the time delays involved in A/D conversion, data transmission and PWM integration mean that the feedback loop has to be relatively slow to be stable. This can lead to visible flicker and brightness variations during the slow control loop's adjustment phase.

In the second mode the current is governed solely by the LED current source Q4/Q5. To trade off efficiency versus regulation headroom, the Q4's drain voltage is measured by U1 and kept constant through feedback to the CPU of the primary side. Maintaining a higher voltage will enable larger variations in Vin before Q4 loses regulation, at the expense of higher power dissipation in Q4. This headroom/dissipation tradeoff can be changed dynamically in software, based on a history of measurements that takes the average variations in the current working environment into account.

Example 1

Use of Coupling for Data Transmission and Acquisition

The coupling of the present invention is used to provide a network suitable for data transmission and control relating to street lighting, power metering and other appliances. In this embodiment the coupling incorporates a device providing high level communication protocols using small, wireless, low power digital radio transmitter/receivers such as a Zigbee™ chip or router. Preferably the device is incorporated into the mounting member and receives signals/information from the controls such as when lamp has blown or is not operating properly.

Figure 10:
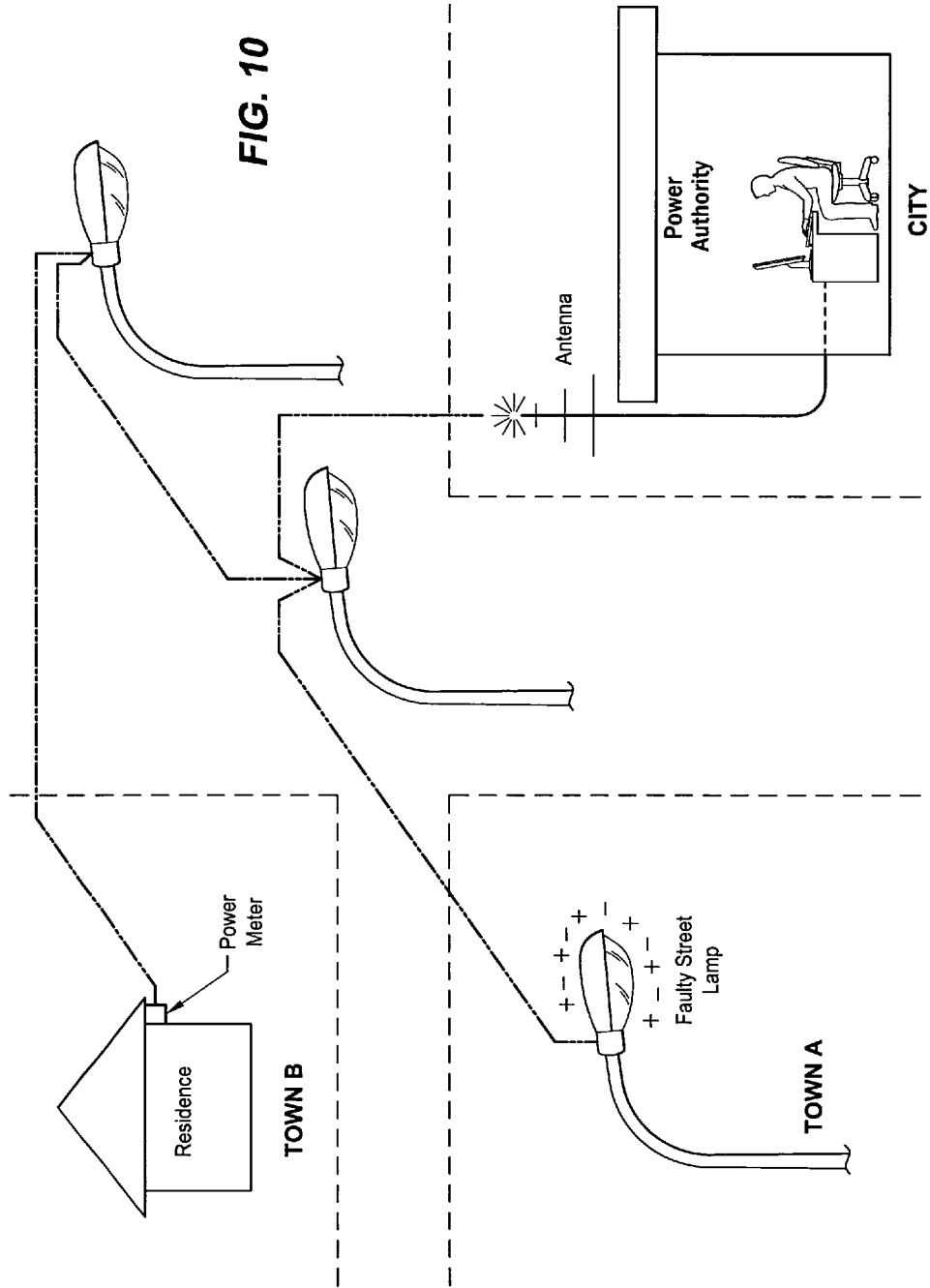
FIG. 10 is a schematic representation of how the coupling of the present invention may be used in a system for data acquisition and control between locations.

In the system shown in FIG. 10 faulty street lamp in town A fitted with the coupling is able to transmit a signal via a series of similarly fitted street lamps back to the power authority. The signal is received and a maintenance person dispatched to replace the faulty lamp.

Similarly a power meter on a residence in town B may be read by the power authority issuing a signal asking the meter for its reading or by the meter transmitting readings at predetermined intervals (say every billing period). Thus the power meter may transmit data concerning power consumption or requirements to the power authority and/or may receive control signals from the power authority to reduce consumption in periods of high demand. Power meters or submeters such as those produced by Saturn South™ may be used in this system.

Optionally each of the appliances used with the coupling has its own internet protocol (IP) address to facilitate further control of the appliance.

In the system contemplated a series of street lamps with the light fittings of the present invention provides a distributed secure control network which avoids the need for telephone cables to transmit data. In a sense the invention provides for a de facto network. The network has the ability to act as an "intelligent swarm". Should one or more of the light poles be damaged (by a storm or a vehicle accident) the remaining nearby poles fitted with the coupling incorporating digital radio transmitter/receivers are able to locate each other and compensate for the damaged poles.

It can be seen from the above that the coupling of the invention has many uses such as remote reading of power meters, real time monitoring of power distribution system performance, transponder tracking, reporting faults with street lights or other equipment. Control of remote loads such as equipment in a person's home by a power authority is also possible where household equipment associated with the coupling has its own IP address and can be switched on or off via a router and broadband connection. This may enable the supply of power at low demand times.

Example 2

Use of Coupling for Controlling Lighting at Industrial Sites

The invention allows for remote control of lighting in large areas such as industrial sites where it may be desirable to save energy. At night or other times the lights may be run at half brightness and only powered up to full brightness when needed. This may be achieved by lights used with the coupling having a zigbee chip or similar incorporated into the controls of the primary side and activated by a controller on a key fob or the like carried by a worker. As the worker moves around the site the lights are brought up to full brightness and are dimmed after a predetermined time once the worker has moved away. In this embodiment the controller in the key fob acts as a coordinator of a zigbee or similar network. Thus the invention also provides for a method of proximity controlled dimming/luminescence of a light or lighting system.

Throughout this specification and the claims that follow, unless the context requires otherwise the words "comprise", "comprises", "comprising" will be understood to mean the inclusion of the stated integer, step or group of integers or steps but not the exclusion of any of other integer, step or group of integers or steps.

The invention claimed is:

1. A coupling for use with a standard industrial or commercial lamp fitting operated by a power supply, wherein the coupling allows safe and intrinsically safe mounting/dismounting of the lamp fitting without electrical isolation from the power supply, said coupling comprising:
   a) a mounting member comprising:
      a first encapsulated transformer element,
      first controls connectable to the power supply, wherein the power supply is a mains power supply that permanently supplies power to the first encapsulated transformer element, and
      a cylindrical sleeve with an open end to receive a spigot containing electrical wiring from the power supply; and
   b) a holder member for holding the lamp fitting and engageable with said mounting member, wherein the holder member comprises:
      a cylindrical element adapted to receive at least a portion of the mounting member,
      second controls, and
      a second encapsulated transformer element to conduct power from the power supply to said lamp fitting;
   wherein when the mounting member is engaged with the holder member:
      i) current is inducted in the second encapsulated transformer element to continuously power the lamp fitting, and
      ii) a signal is carried between the first and second controls and the lamp fitting to control and/or monitor the lamp fitting, wherein the signal is carried by a communications path between said first controls of the first encapsulated transformer element and said second controls of the second encapsulated transformer element, said communications path provided by an optical path with infrared light via a light tube, the signal including information about the lamp fitting selected from the group consisting of: power feedback, dimming, blinking, changes in color, and temperature;
   wherein when the mounting member is disengaged from the holder member there is no induction of current in the second encapsulated transformer element and there is no signal carried between the first and second controls and the lamp fitting; and
   wherein, when the mounting and holder members are engaged, the mounting and holder members form a weather resistant housing.

2. The coupling of claim 1 wherein said first and second controls allow the lamp fitting to operate in a range of power supply voltages and/or detect the presence or absence of the lamp fitting on the coupling.

3. The coupling of claim 1 wherein communication is provided by an IR LED and an IR receiver.

4. The coupling of claim 1, wherein the lamp fitting comprises at least one LED.

5. The coupling of claim 1 wherein the mounting and holder members are configured to i) ensure alignment of the communication path when the mounting and holder members are engaged and ii) form a protective housing having a longitudinal axis, wherein outer surfaces of the first and second encapsulated transformer elements are physically contactable through 360° of rotation about the axis.

6. Use of the coupling of claim 1 to mount a standard industrial or commercial lamp fitting to a structure.

7. The coupling of claim 1 wherein the first and second encapsulated transformer elements comprise windings in the form of suitable printed or etched material.

8. The coupling of claim 1 wherein the first and second controls comprise a programmed CPU.

9. A method of manufacture of coupling for use with a standard industrial or commercial lamp fitting operated by a power supply, wherein the coupling allows safe and intrinsically safe mounting/dismounting of the lamp fitting without electrical isolation from the supply, said method comprising:
   producing a coupling by assembling:
      a) a mounting member comprising:
         a first encapsulated transformer element,
         first controls connectable to the power supply, wherein the power supply is a mains power supply that permanently supplies power to the first encapsulated transformer element, and
         a cylindrical sleeve with an open end to receive a spigot containing electrical wiring from the power supply; and
      b) a holder member for holding the lamp fitting and engageable with said mounting member, wherein the holder member comprises:
         a cylindrical element adapted to receive at least a portion of the mounting member,
         second controls, and
         a second encapsulated transformer element to conduct power from the power supply to said lamp fitting;
   wherein when the mounting member is engaged with the holder member:
      i) current is inducted in the second encapsulated transformer element to continuously power the lamp fitting, and
      ii) a signal is carried between the first and second controls and the lamp fitting to control and/or monitor the lamp fitting, wherein the signal is carried by a communications path between said first controls of the first encapsulated transformer element and said second controls of the second encapsulated transformer element, said communications path provided by an optical path with infrared light via a light tube, the signal including information about the lamp fitting selected from the group consisting of: power feedback dimming, blinking, changes in color, and temperature;
   wherein when the mounting member is disengaged from the holder member there is no induction of current in the second encapsulated transformer element and there is no signal carried between the first and second controls and the lamp fitting; and
   wherein, when the mounting and holder members are engaged, the mounting and holder members form a weather resistant housing.

10. An improved method of maintenance of a standard industrial or commercial lamp fitting operated by a power supply which method allows safe and intrinsically safe mounting/dismounting of the lamp fittings without electrical isolation from the supply, said method comprising:

provision of the standard industrial or commercial lamp fitting associated with a coupling, said coupling comprising:
a) a mounting member comprising:
a first encapsulated transformer element,
first controls connectable to the power supply, wherein the power supply is a mains power supply that permanently supplies power to the first encapsulated transformer element, and
a cylindrical sleeve with an open end to receive a spigot containing electrical wiring from the power supply; and
b) a holder member for holding the lamp fitting and engageable with said mounting member, wherein the holder member comprises:
a cylindrical element adapted to receive at least a portion of the mounting member,
second controls, and
a second encapsulated transformer element to conduct power from the power supply to said lamp fitting;
wherein when the mounting member is engaged with the holder member:
i) current is inducted in the second encapsulated transformer element to continuously power the lamp fitting, and
ii) a signal is carried between the first and second controls and the lamp fitting to control and/or monitor the lamp fitting, wherein the signal is carried by a communications path between said first controls of the first encapsulated transformer element and said second controls of the second encapsulated transformer element, said communications path provided by an optical path with infrared light via a light tube, the signal including information about the lamp fitting selected from the group consisting of: power feedback, dimming, blinking, changes in color, and temperature;
wherein when the mounting member is disengaged from the holder member there is no induction of current in the second encapsulated transformer element and there is no signal carried between the first and second controls and the lamp fitting;
wherein, when the mounting and holding members are engaged, the mounting and holding members form a weather resistant housing; and
wherein replacement of the lamp fitting can be carried out under full power load by disengaging the holder member and replacing it with a new lamp fitting attached to a second holder member.

11. A method of providing proximity activated control of luminescence in at least one lamp comprising:
providing a standard industrial or commercial lamp fitting including the at least one lamp, the lamp fitting operated by a power supply and mounted on a structure in a location, wherein the lamp fitting is associated with a coupling which allows safe and intrinsically safe mounting/dismounting of the lamp fitting without electrical isolation from the power supply, the coupling comprising:
a) a mounting member mounted on a structure, said mounting member comprising:
a first encapsulated transformer element,
first controls connectable to the power supply, wherein the power supply is a mains power supply that permanently supplies power to the first encapsulated transformer element, and
a cylindrical sleeve with an open end to receive a spigot containing electrical wiring from the power supply; and
b) a holder member for holding the lamp fitting and engageable with said mounting member, wherein the holder member comprises:
a cylindrical element adapted to receive at least a portion of the mounting member,
second controls, and
a second encapsulated transformer element to conduct power from the power supply to the lamp fitting;
wherein one of the mounting and holder members includes a wireless digital radio transceiver able to receive signals from and transmit signals to said coupling attached to the structure within range and receive signals from and transmit signals to a control station;
wherein when the mounting member is engaged with the holder member:
i) current is inducted in the second encapsulated transformer element to continuously power the lamp fitting; and
ii) a signal is carried between the first and second controls and the lamp to control and/or monitor the lamp fitting, wherein the signal is carried by a communications path between said first controls of the first encapsulated transformer element and said second controls of the second encapsulated transformer element, said communications path provided by an optical path with infrared light via a light tube, the signal including information about the lamp fitting selected from the group consisting of: power feedback, dimming, blinking, changes in color, and temperature;
wherein when the mounting member is disengaged from the holder member there is no induction of current in the second encapsulated transformer element and there is no signal carried between the first and second controls and the lamp fitting;
wherein luminescence of the at least one lamp is controlled by a remote controller via the radio transceiver, said remote controller being operational within a predetermined distance from the coupling and/or manually; and
wherein, when engaged, the mounting and holder members form a weather resistant housing.

12. The method of claim 11 wherein the remote controller is carried by a person or vehicle.

13. A method of providing a distributed supervision control and data acquisition network for remotely controlling a standard industrial or commercial lamp fitting, said method comprising
providing the lamp fitting that is operated by a power supply mounted on power poles or other structures in a location, the lamp fitting associated with a coupling that allows safe and intrinsically safe mounting/dismounting of the lamp fitting without electrical isolation from the power supply, the coupling comprising:
a) a mounting member mounted on a power pole or other structure, said mounting member comprising:
a first encapsulated transformer element,
first controls connectable to the power supply, wherein the power supply is a mains power supply that permanently supplies power to the first encapsulated transformer element, and
a cylindrical sleeve with an open end to receive a spigot containing electrical wiring from the power supply; and b) a holder member for holding the lamp fitting and engageable with said mounting member, wherein the holder member comprises:
- a cylindrical element adapted to receive at least a portion of the mounting member,
- second controls, and
- a second encapsulated transformer element to conduct power from the power supply to the lamp fitting;

wherein one of the mounting and holder members includes a wireless digital radio transceiver able to receive signals from and transmit signals to couplings attached to other poles or structures within range and receive signals from and transmit signals to a control station;

wherein when the mounting member is engaged with the holder member
- i) current is inducted in the second encapsulated transformer element to continuously power the lamp fitting; and
- ii) a signal is carried between the first and second controls and the lamp fitting to control and/or monitor the lamp fitting, wherein the signal is carried by a communications path between said first controls of the first encapsulated transformer element and said second controls of the second encapsulated transformer element, said communications path provided by an optical path with infrared light via a light tube, the signal including information about the lamp fitting selected from the group consisting of: power feedback, dimming, blinking, changes in color, and temperature;

wherein when the mounting member is disengaged from the holder member there is no induction of current in the second encapsulated transformer element and there is no signal carried between the first and second controls and the lamp fitting;

wherein the coupling is able to receive signals from and transmit signals to the control station allowing remote control of the lamp fittings; and wherein, when engaged, the mounting and holder members form a weather resistant housing.

* * * * *